United States Patent Office 3,298,972
Patented Jan. 17, 1967

3,298,972
CELLULAR POLYMERIC COMPOSITIONS AND
METHOD FOR THEIR PREPARATION
Roland J. Kern, Bridgeton, Mo., assignor to Monsanto
Company, a corporation of Delaware
No Drawing. Filed Dec. 6, 1963, Ser. No. 328,519
16 Claims. (Cl. 260—2.5)

This invention relates to novel foamed polymeric materials and to a method for their preparation.

This invention particularly relates to foamed products derived from copolymers of unsaturated acid anhydrides and tertiary butyl vinyl ether.

It is an object of this invention to provide novel foamed polymeric materials.

It is another object of this invention to provide a direct method for simply converting certain polymeric materials to foamed compositions having a different polymeric molecular structure.

It is another object of this invention to prepare foamed in place polymer by employment of a heating step whereby a molecular rearrangement of the starting polymeric material provides the expanding agent.

It is yet another object of this invention to prepare foamed in place polymeric materials that can be readily removed, or dissolved with a solvent. Many polymeric foams are produced by formation of a crosslinked polymer network which is thereafter insoluble, but the cellular compositions of this invention can be dissolved in alkaline aqueous solution if desired.

It is another object of this invention to provide foamed polymeric compositions containing lactone rings which provide strength and rigidity to the compositions.

The reaction of the present invention involves an ether group attached to the polymer chain through the ether oxygen atom, when said ether group is neighboring (or adjacent) to a carbonyl group. Internal lactonization occurs with the formation of, generally five membered rings, although four and also six membered ring lactones can also be formed.

The polymeric reactant of the invention is an alternating copolymer obtained by the copolymerization of tert-butyl vinyl ether with an olefinically unsaturated dicarboxylic acid anhydride. The copolymer is characterized by its content of equivalent amounts of vinyl ether monomer and unsaturated acid anhydride monomer. Although I normally prefer to conduct the rearrangement, or foaming step, with the two-component copolymer the novel reaction is applicable to polymers containing minor amounts, less than about 15 weight percent of the total polymer weight, of a third monomer. Suitable monomers include alkyl acrylates, alkyl methacrylates, vinyl chloride, vinylidine chloride, vinylidine fluoride, vinyl acetate, ethylene, propylene, isobutylene, α-methylstyrene. The third monomer can be employed as a diluent or an extender in modifying the quantity of gas released, since the quantity of expanding gas is proportional to the content of tert-butyl vinyl ether monomer in the polymer.

According to my invention, a polymer containing a tert-butyl ether linkage attached to the carbon-carbon polymer backbone is rearranged under the influence of moderate heating. The ether linkage is usually adjacent to a carbonyl group which is incorporated into an acid anhydride linkage. The rearrangement is accomplished through the splitting of the ether linkage to yield isobutylene which is an efficient expanding or blowing agent for foaming the resulting lactone.

A typical equation for the reaction can be written as follows:

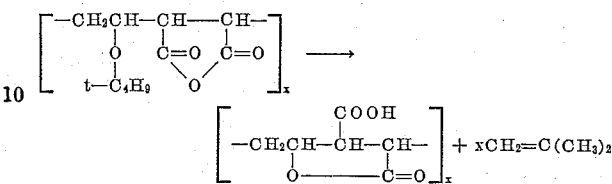

wherein $x$ is equivalent to the degree of polymerization, and generally will be 20 or more and can be as high as 1000, and up to 10,000 or even greater.

When the copolymer is subjected to moderate heat the rearrangement results in isobutylene production. It is well within the skill of a polymer chemist, having been given the benefit of the present disclosure, to adjust the heating temperature to obtain foamed polymer containing isobutylene trapped in closed cells. The isobutylene release occurs at a slow rate at temperatures about 65° C., but preferably temperatures above about 90° C., are employed to obtain a foamed composition within a reasonable time.

The temperature range used in foaming the polymer depends to a certain extent on the ultimate use of the resultant foam. Cell size is more uniform and the individual cells are smaller if a lower temperature is used, generally about 90° C., to about 160° C.; however, the foamed product can be produced at temperatures of 200° C., or higher with short heating times. It will be understood that the time and temperature required for foaming a given sample depend upon the shape and bulk of the polymer subjected to this step. Heat transfer through a partially foamed, thick specimen is slow, and thus routine experimentation may be required to obtain optimum physical properties in the product foam, in cases where a thick section or unusual shape of starting polymer is used.

The polymers useful in the preparation of the foamed compositions are essentially tert-butyl vinyl ether copolymers with maleic anhydride, citraconic anhydride, or itaconic anhydride, although terpolymers containing up to about 15 weight percent of a third monomer can be used. These polymers can be prepared in the presence of a free radical type catalyst, for example, an organic peroxygen compound. The peroxygen compound can be activated by trialkylboranes in promoting the polymerization, so that rearrangement of the product does not occur during the polymerization step.

Included among the suitable peroxygen catalysts are the peroxides, such as diacetyl peroxide, acetyl benzoyl peroxide, dipropionyl peroxide, dilauroyl peroxide and methyl ethyl ketone peroxide, and the hydroperoxides such as cyclohexyl hydroperoxide, cumene hydroperoxide, tert-butyl hydroperoxide, and methyl cyclohexyl hydroperoxide. This listing is by no means a complete tabulation of suitable polymerization catalysts, but merely illustrates some of the representative materials that can be used.

Since it is desired to prepare polymer free of lactone linkages, the copolymerization should be conducted at low temperatures, preferably below 60° C. and more preferably below 50° C. The activation of a peroxygen compound with a trialkylborane has enabled me to conduct the polymerization at a temperature such that polymer free of lactone linkages is produced.

Compounds that can be used as activators include the boron hydrides (boranes) and substituted boranes such as borane, diborane, triborane, tetraborane, trimethylborane, triethylborane, tripropylborane, trihexylborane, trioctylborane, tricyclohexylborane, triphenylborane, tribenzylborane and tritolylborane. I prefer to employ a trialkylborane of the formula $BR_3$, wherein R is an alkyl group of 1 to about 14 carbon atoms.

The boranes can be complexed with a primary, secondary or tertiary amine. Suitable amines which can be used include methylamine, dimethylamine, trimethylamine, dimethylbutylamine, triethanolamine, n-ocylamine, pyridine, the picolenes, aniline, dimethylaniline, the toluidines, and mixtures of different amines. The mole ratio of amine to boron comound is within the range of 0.1:2 to about 10:1, and is preferably within the range of 0.5:1 to about 2:1.

The polymerization reaction is normally conducted in an inert solvent or diluent. Those solvents which do not contain olefinic unsaturation and which are inert to the catalysts and reactants are preferred, such as benzene, toluene, xylene, tetralin, hexane, octane, dioxane, acetone, chloroform and cyclohexane.

If certain monomers are introduced into the polymerization reaction, as mentioned above, the quantity of isobutylene given off during the rearrangement is reduced: Thus, if the third monomer is propylene, which does not copolymerize with tert-butyl vinyl ether, every other monomer unit along the polymer chain must be derived from the unsaturated acid anhydride. The tendency of two anhydride units to enter the chain adjacent to one another is very low. In this situation, the propylene then competes only with the tert-butyl vinyl ether to appear in the chain as alternating comonomer unit with the unsaturated acid anhydride. The tert-butyl vinyl ether then participates to a lesser extent in the polymerization, resulting in the reduction of isobutylene available as a blowing agent or expanding agent during the rearrangement step.

The cellular products of this invention can be prepared having fillers, dyes, stabilizers, antioxidants, flame retardants, pigments and plasticizers incorporated in the finished compositions. These materials can simply be mixed with the initial polymer by blending, or by preparing intimate mixtures of the desired components prior to the foaming step.

The practice of this invention enables one to utilize the cooplymers described herein to produce rigid, polymeric foams in locations normally inaccessible to conventional foaming techniques, for example the polymeric starting material can be used to make a temporary plug in a piping setup by merely applying heat to the spot where a plug is needed. The plug is termed temporary since it can be dissolved readily with an aqueous alkaline solution. This application can be incorporated into safety devices where localized heating can be utilized to cut off a process stream as the foamed composition blocks an inlet to a chemical reactor.

The polymer can be compression molded at temperatures below about 50° C. to a desired shape and then foamed to produce shaped foams, or if the polymer is extruded the foaming reaction can be condensed in the extruder so that foamed shapes can be produced directly. By this later technique foamed sheets, or foamed blocks of the intercellular polymer can readily be prepared. Foamed in place polymer can be prepared by the application of heat to the copolymer in a spray head, by forcing polymer particles onto a heated surface, or by heating roughly shaped polymer with an infrared source or heat gun which utilizes a stream of heated air. A dope of the copolymer in suitable solvent (chloroform, $CH_2Cl_2$) may be cast or coated on a surface of paper, fabric, glass etc., and the dry film subsequently foamed by application of heat. Other applications of the foamed polymer will become apparent to those skilled in the art upon reading the disclosure of invention as set forth herein.

The polymer obtained as the result of the rearrangement reaction contains the reactive lactone ring and additionally has activated carboxylic acid groups attached to the polymer backbone. The acid groups can be esterified, e.g. with alcohols of up to about 14 carbon atoms, to produce other polymers having desirable physical properties including high modulus over a broad temperature range and high impact strength.

The foamed polymers of this invention can be prepared by blending the initial polymer with a blowing agent or expanding agent in order to obtain increased expansion over that obtained by release of isobutylene, but this added expanding effect is not generally needed.

Foamed polymers can be prepared of varied density by modifying processing techniques. For example, a high density foam can be prepared by restraining the foaming polymer in a mold that confines the foam. For an intermediate density foam, the polymer can be heated under compression to form the foam under slight pressure, and, if no restraint or compressive force is applied during the foaming step, or until the polymeric foam has cooled, lowest density foams are prepared.

In order to illustrate some of the various aspects and advantages of the invention, representative examples are given below. It will be understood that variations from the particular reactants, catalyst, proportions and processing techniques can be made without departing from the invention.

*Example 1*

A 500 ml. glass reactor, fitted with mechanical stirrer and reflux condenser, was charged with 80 ml. dry benzene, maleic anhydride (19.6 g., 0.2 mole) and tert-butyl vinyl ether (20.0 g., 0.2 mole). Lauroyl peroxide (0.15 g.) was added and the solution warmed to about 40°. Polymerization occurred at a rapid rate and the white copolymer precipitated from solution in quantitative yield. The product was purified by dissolving it in chloroform and precipitating it with benzene.

*Example 2*

The copolymerization of tert-butyl vinyl ether and maleic anhydride was repeated as described in Example 1, with the exception that dry chloroform was used as the polymerization solvent. The reaction took place rapidly and was completed within an hour. Part of the viscous solution was used to cast a film on a glass plate, and the remainder was treated with benzene to precipitate the white copolymer. Infrared spectroscopic examination of the copolymer was used to confirm the formation of the alternating copolymer. The product, whether produced according to the procedure of Example 1 or Example 2, had a specific viscosity of 0.155, measured as a 0.1% solution in acetone at 25° C.

*Example 3*

A dry 300 ml. glass reactor, fitted with stirring device and reflux condenser, was charged with 100 ml. dry benzene, redistilled citraconic anhydride (22.8 g., 0.2 mole) and tert-butyl vinyl ether (20.0 g., 0.2 mole). The polymerization catalyst, consisting of 0.05 g. lauroyl peroxide and 0.3 ml. triethylborane, was added and the solution stirred at 30–40° C. The polymerization proceeded rapidly, as evidenced by a gradual but apparent increase in the solution viscosity. The reaction was judged to be completed after six hours at 30–40° C. The copolymer was purified by precipitating it with methanol, redissolving it in chloroform and again precipitating with hexane. The snow-white product was dried in the vacuum oven to remove traces of adhering solvent. It was possible to cast a clear, colorless film onto a glass plate by using a chloroform solution of this product. The copolymer had a specific viscosity of 0.09, measured as a 0.1% solution in acetone at 25° C., and gave excellent elemental analytical results, in comparison with the calculated values for carbon and hydrogen. This copolymer was further characterized as the alternating copolymer by infrared absorption spectra. It was easily soluble in benzene whereas the corresponding maleic anhydride copolymer is insoluble in benzene.

It was determined that this copolymerization proceeded to completion under the same conditions as described above, but without the employment of a diluent. The copolymer had similar properties to that obtained when a diluent was used.

*Example 4*

A sample of the tert-butyl vinyl ether/maleic anhydride copolymer of Example 1 was placed in a glass reactor having its sole outlet connected to a gas sampling apparatus. The polymer was heated by immersing the reactor in a silicone oil bath maintained at 150° C. The polymer began to foam almost immediately and within several minutes the fine celled foam occupied a volume approximately ten times the volume of the original polymer charge.

The gas given off by the foaming reaction was analyzed in the gas chromatograph, and found to be pure isobutylene (compared with pure samples of isobutylene).

*Example 5*

The gas driven off when the copolymer of tert-butyl vinyl ether/citraconic anhydride (Example 3) was heated according to the procedure of Example 4 was analyzed and found to be pure isobutylene. The volume increase of the cellular polymer was estimated to be at least ten times greater than the volume of the original polymer.

It was determined that small quantities of $CO_2$ are given off when the foaming reaction is conducted at higher temperatures (above about 200° C.) apparently due to decarboxylation of the polymer.

*Example 6*

A sample of the tert-butyl vinyl ether/maleic anhydride copolymer of Example 2 was molded at room temperature under high pressure (app. 3000 p.s.i.) with a small quantity of gum binder. The shaped specimen bar was placed in a forced air oven maintained at 125° C. After 20 minutes the sample was removed and examined. A rigid, foamed bar was obtained, containing uniform, minute cells. By comparison of initial and final apparent volume of the materials it was determined that a 14.5-fold volume increase had occurred. The foamed specimen retained its shape and dimensions when cooled to room temperature.

The foamed product was found to liberate carbon dioxide when shaken with aqueous potassium carbonate solution, and the foam readily dissolved in alkaline solutions such as dilute aqueous sodium hydroxide, or dilute sodium bicarbonate.

Similar foaming and solubility characteristics were exhibited by the tert-butyl vinyl ether/citraconic anhydride copolymer of Example 3.

The foamed compositions were completely soluble in aqueous alkaline solutions. The lactone polymer is recovered from the alkaline solution by acidification of the solution.

A sample of the recovered lactone, obtained by treatment of the alkaline solution with hydrochloric acid, was thoroughly washed with distilled water to remove any adhering salt and dried in the vacuum oven. The infrared spectrum of this polymer was compared with the infrared spectrum of the original tert-butyl vinyl ether/maleic anhydride copolymer. The lactone spectrum was consistent with the postulated loss of the tert-butyl group and/or the tert-butoxy group (at 7.2, 8.0 and 12.3 microns) and also the loss of characteristic anhydride band (at 5.40 microns), while a new band characteristic of hydrogen bonded carboxylic acid was present (at 6.1 microns).

It will be understood that lactone formation is not limited to products of five-membered rings, but that four-membered and six-membered lactones can also be obtained, according to the equation:

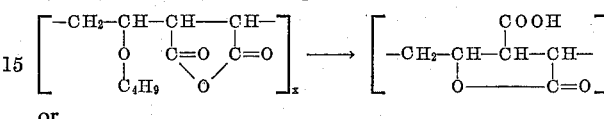

or

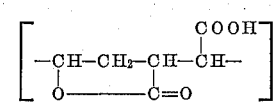

or

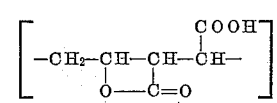

*Example 7*

Copolymers of maleic anhydride with methyl vinyl ether, and maleic anhydride/isobutyl vinyl ether were prepared according to the procedure of Example 1. Neither copolymer exhibited the foaming propensities of the tert-butyl vinyl ether/maleic anhydride copolymer when heated.

*Example 8*

The lactone polymer obtained by heating the tert-butyl vinyl ether copolymer of maleic anhydride, itaconic anhydride, or citraconic anhydride is further characterized by the presence of a carboxylic acid group. This acid group readily participates in an esterification reaction with alcohols. The lactone esters, especially those prepared from long chain alcohols ($C_8$–$C_{18}$) possess remarkable physical properties, for example, they have excellent stiffness modulus properties over a broad temperature range, and additionally they have high impact strength at temperatures where high stiffness modulus properties prevail. The 2-ethylhexyl lactone ester derived from the maleic anhydride copolymer had Izod notched impact strengths of 5 to 6 ft. lbs./in. notch for compression-molded specimens and 2 to 4 ft. lbs./in. notch for injection moldings. The stiffness modulus at 25° C. for this material was 90,000 p.s.i. The lactone ester prepared from the heat-treated tert-butyl vinyl ether/maleic anhydride copolymer, esterified with coconut fatty alcohols ($C_8$–$C_{18}$), had an Izod impact strength of 5 ft. lbs./in. notch for a compression molding and 4 ft. lbs./in. notch for an injection-molded specimen. The stiffness modulus for this ester at 25° C. was 35,000 p.s.i. The physical properties of these polymeric lactone esters compare favorably with the properties of polyethylene and nylon, and are significant in the coincidence of high modulus with excellent impact strength.

While the invention has been described with particular reference to preferred embodiment thereof, it will be appreciated that variations from the details given herein can be effected without departing from the invention in its broadest aspects.

What is claimed is:

1. A cellular polymeric lactone product obtained by heating a tert-butyl vinyl ether/unsaturated carboxylic acid anhydride copolymer at a temperature sufficiently high to rearrange the molecular structure of said copolymer and to liberate isobutylene gas.

2. The product of claim 1 wherein said unsaturated carboxylic acid anhydride is maleic anhydride.

3. The product of claim 1 wherein said unsaturated carboxylic acid anhydride is itaconic anhydride.

4. The product of claim 1 wherein said unsaturated carboxylic acid anhydride is citraconic anhydride.

5. The cellular product of claim 1 wherein said rearrangement results in liberation of isobutylene which functions as an expanding agent.

6. A cellular lactone polymeric product obtained by the heat-induced rearrangement of a polymer comprising tert-butyl vinyl ether and a monomer selected from the group consisting of maleic anhydride, itaconic anhydride, and citraconic anhydride.

7. A cellular lactone polymeric composition comprising a polymer characterized by lactone groups along the polymer chains, wherein said composition is prepared by heating an interpolymer of tert-butyl vinyl ether and an unsaturated carboxylic acid anhydride.

8. The composition of claim 7 wherein said unsaturated carboxylic acid anhydride is maleic anhydride.

9. The composition of claim 7 wherein said unsaturated carboxylic acid anhydride is itaconic anhydride.

10. The composition of claim 7 wherein said unsaturated carboxylic acid anhydride is citraconic anhydride.

11. A cellular polymeric composition comprising a polymer characterized by lactone groups along the polymer chains, and a ready solubility in aqueous alkaline solution, wherein said composition is prepared by heating an alternating copolymer of tert-butyl vinyl ether and maleic anhydride at a temperature sufficiently high to rearrange the molecular structure of said copolymer, with the accompanying liberation of isobutylene which is utilized as an expanding agent.

12. A process for the preparation of a cellular polymeric composition which comprises heating a polymer obtained by the polymerization of tert-butyl vinyl ether and an unsaturated carboxylic acid anhydride, wherein said heating is conducted at a temperature sufficiently high to promote rearrangement of said polymer and to liberate isobutylene as an expanding agent.

13. The process of claim 12 wherein said unsaturated carboxylic acid anhydride is maleic anhydride.

14. The process of claim 12 wherein said unsaturated carboxylic acid anhydride is itaconic anhydride.

15. The process of claim 12 wherein said unsaturated carboxylic acid anhydride is citraconic anhydride.

16. The process for the preparation of polymers characterized by lactone groups along the polymer chain which comprises heating an alternating copolymer of tert-butyl vinyl ether and an anhydride selected from the group consisting of maleic anhydride, itaconic anhydride and citraconic anhydride, said heating being at a temperature sufficiently high to rearrange said alternating copolymer and to liberate isobutylene gas.

References Cited by the Examiner
UNITED STATES PATENTS

| | | | |
|---|---|---|---|
| 2,861,056 | 11/1958 | Minsk | 260—78.5 |
| 2,988,539 | 6/1961 | Cohen et al. | 260—78.5 |
| 2,997,464 | 8/1961 | Sellers | 260—78.5 |
| 3,044,970 | 7/1962 | Baumeister | 260—86.3 |
| 3,224,982 | 12/1965 | Zutty et al. | 260—2.5 |

MURRAY TILLMAN, *Primary Examiner.*

N. F. OBLON, *Assistant Examiner.*